AUTOMATIC ERROR DETECTION AND CORRECTION SYSTEM

Filed July 16, 1968 2 Sheets-Sheet 1

INVENTOR
HAROLD D. COOK
BY [signature]
ATTORNEY

Dec. 29, 1970 H. D. COOK 3,551,886

AUTOMATIC ERROR DETECTION AND CORRECTION SYSTEM

Filed July 16, 1968 2 Sheets-Sheet 2

United States Patent Office 3,551,886
Patented Dec. 29, 1970

3,551,886

AUTOMATIC ERROR DETECTION AND CORRECTION SYSTEM

Harold D. Cook, Wheaton, Ill., assignor to Teletype Corporation, Skokie, Ill., a corporation of Delaware Filed July 16, 1968, Ser. No. 745,247
Int. Cl. G06f *11/08;* G11b *27/22*
U.S. Cl. 340—146.1 3 Claims

ABSTRACT OF THE DISCLOSURE

In an automatic error detection and correction system for a parallel magnetic tape recorder employing phase modulation recording, an index track and a separate vertical parity check track are recorded on the tape in addition to the normal data tracks, with the outputs of the data tracks and the parity check track being supplied to a parity check circuit or counter. A detector is provided to detect whether or not a signal transition occurs in each track of a recorded character, and if a signal transition is missing in any track, the output of the parity check circuit is gated with the output signal for the track having no transition in order to provide an output which is indicative of the proper missing bit. For tracks in which signal transitions are detected, the parity check circuit output has no effect.

BACKGROUND OF THE INVENTION

In the recording of high density information on magnetic tape, a problem arises due to "dropouts" of information caused by failure of the tape to record or read information in some areas. Sometimes this is due to inherent defects in the tape material itself; and at other times, "dropouts" are caused by small particles of dust or foreign matter on the tape which result in failures to record data or prevent the reading of data from the tape. These particles of foreign matter often are of sufficient size to cause failure of proper recording or reading for one or two adjacent bits of information. When phase modulation recording is used, or any recording in which each bit is represented by a signal transition at the midpoint of the character space on the tape, it is possible to detect the presence of a "dropout" since no signal transition is detected in such a situation. It also is desirable, however, to provide some means of correcting or supplying the bit which was missing due to the "dropout."

SUMMARY OF THE INVENTION

In an automatic error detection and correction system for a parallel magnetic tape recorder employing recording in the form of a signal transition for recorded bit and having a separate parity check track recorded in conjunction with each character, means are provided for detecting whether or not signal transitions occur in each level of a recorded character. If a transition is missing in any level, the output of the parity channel is utilized in conjunction with the information present in the correctly recorded levels to provide the proper missing bit.

DETAILED DESCRIPTION

Figure 1:
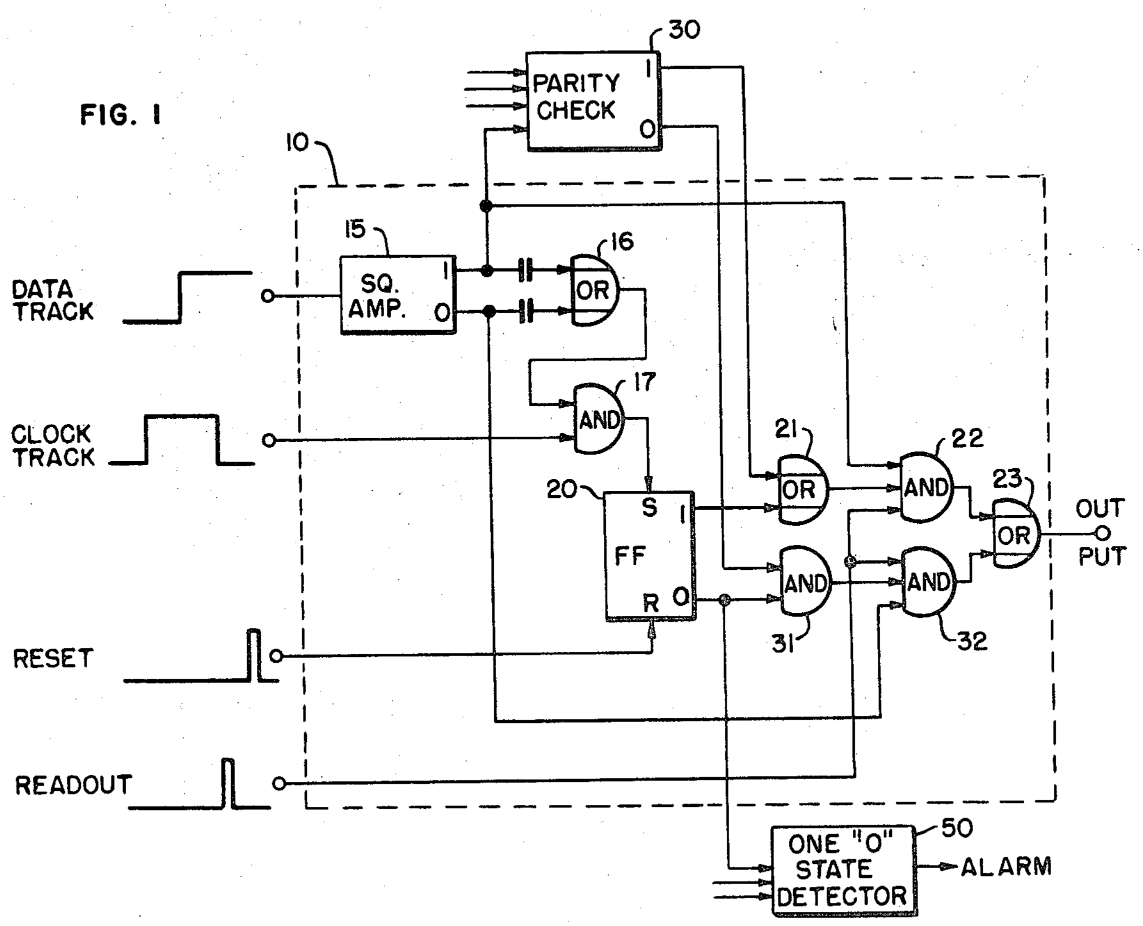
FIG. 1 shows a circuit diagram of the circuit employed with a single data track in a preferred embodiment of the invention.
Figure 3:
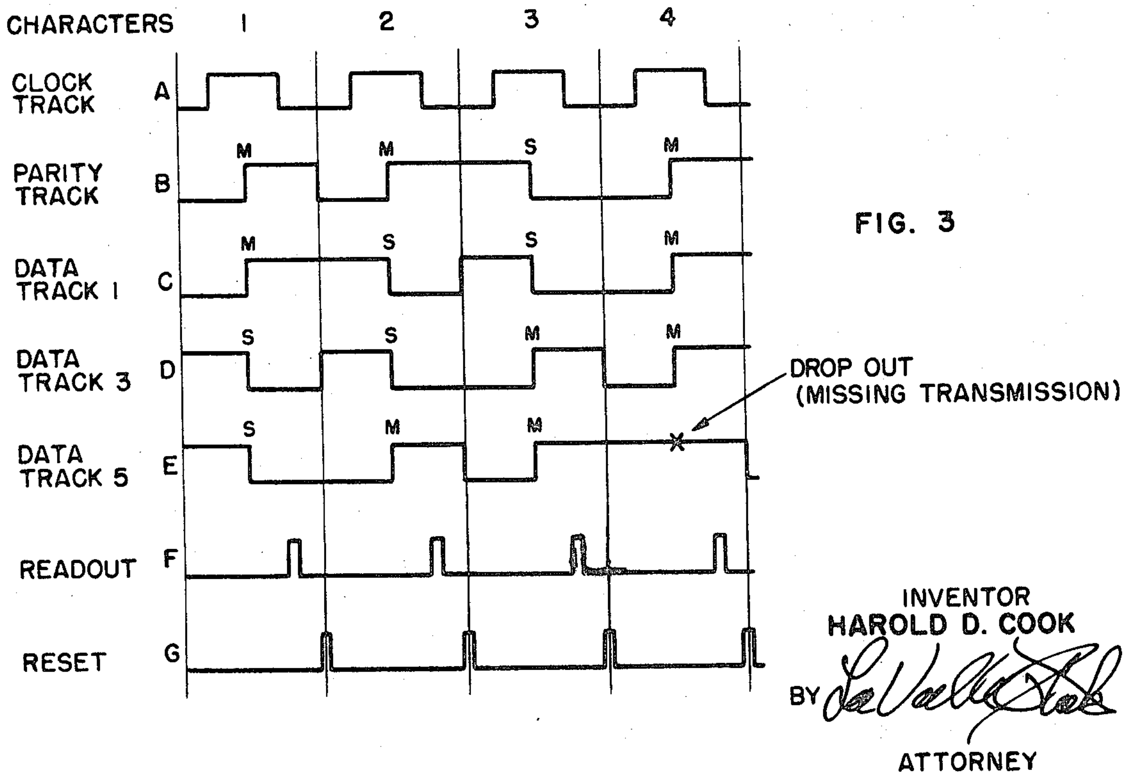
FIG. 3 is a timing diagram illustrating the relative times of occurrences of events in the operation of the circuits of FIGS. 1 and 2.
Figure 2:
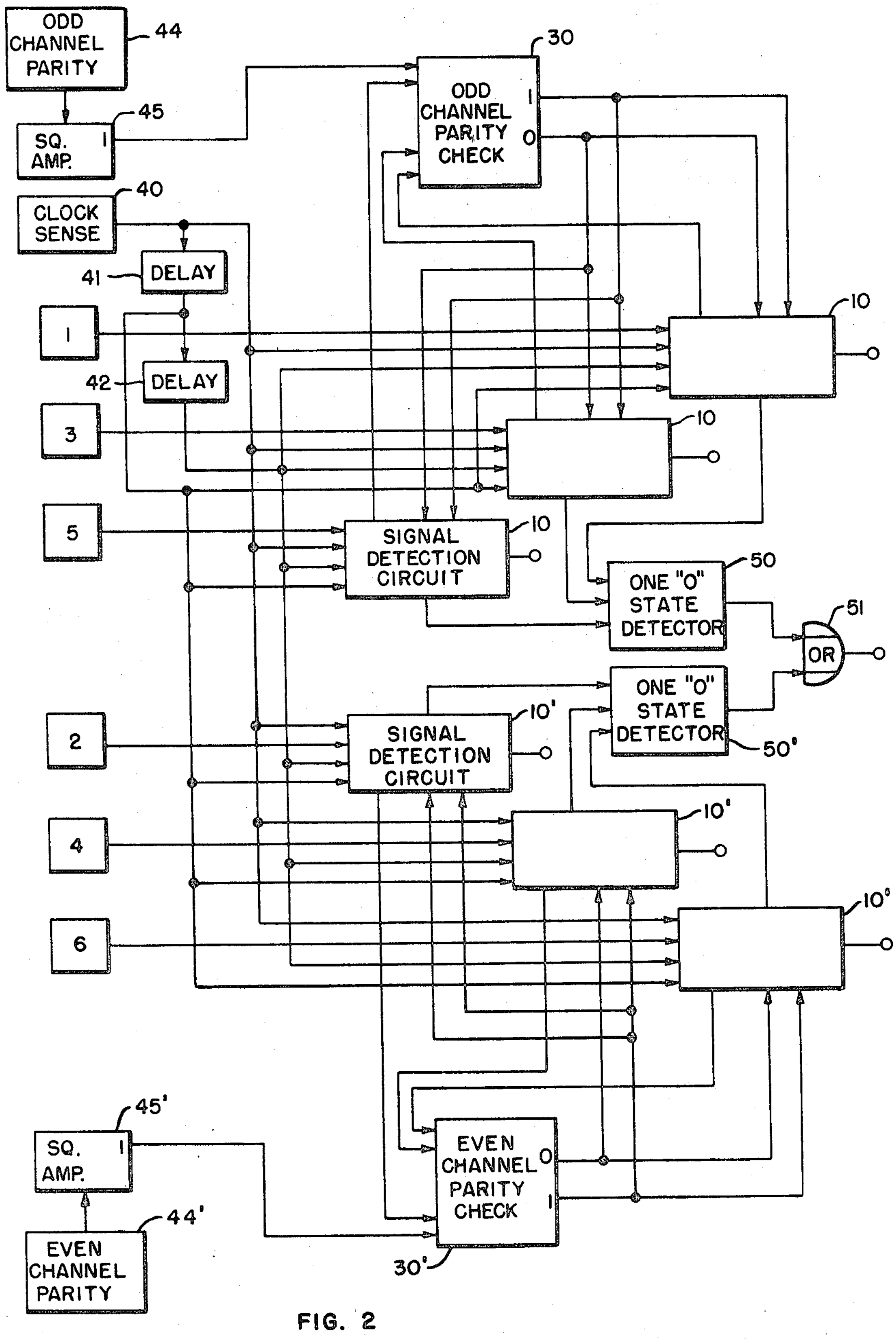
FIG. 2 is a block diagram of the circuit of this invention incorporating a plurality of parallel inputs.

Referring now to FIGS. 1 and 3, there is shown in FIG. 1 a circuit diagram of an automatic error detection and correction system to be employed with a single data track in the read-out circuit of a signal transition recorder in the form of a phase modulation recorder. For the purposes of illustration, assume that, in the phase modulation recording being utilized, a "mark" is represented by a negative-to-positive signal transition in the detected "read-out" signal for a data track of the tape, and that a "space" is represented by a positive-to-negative signal transition. In order that these signal transitions which are representative of data are the only transitions utilized to provide output signals from the read-out circuits, it is necessary to use a clock track or other suitable means for providing a window during which the recorded signal transitions are examined in order to ascertain the nature of the recorded data. In the system under consideration, this is accomplished by recording a clock track providing an output as shown in waveform A of FIG. 3. This clock track provides for a positive output pulse which overlaps the period of time during which the data transitions should appear on each area on the tape where data may be recorded. Referring to FIG. 3, the outputs of the data tracks for the odd numbered tracks on the tape, numbers 1, 3 and 5, are shown in waveforms C, D and E, with a parity check track shown in waveform B, corresponding to the parity check for the data recorded in levels 1, 3 and 5 only. The parity check track B is recorded in order to provide a total number of even "mark" transitions for the odd track subgroups of each character under consideration. It should be noted that for the even tracks 2, 4 and 6, as shown in FIG. 2, a separate parity track is provided for reasons which will be more fully explained hereinafter.

In FIG. 1, there is shown a signal detection circuit 10 having applied thereto information obtained from a particular data track. The signals indicative of the states of the output from the data track are supplied to the input of a conventional squaring amplifier 15 which may be a Schmitt trigger or other suitable device, and the squaring amplifier 15 produces two output signals which are 180° out of phase with one another. These signals may be thought of as "positive" and "negative" output signals, with a positive output signal being obtained only from the "1" output when the data track output (as shown in waveforms C, D and E of FIG. 3) is a positive signal, and with a positive signal being obtained only from the "0" output thereof when the data track output is a negative signal. The output signals of the squaring amplifier 15 are A-C coupled to the two inputs of an OR gate 16; so that whenever a signal transition or change in the outputs of the squaring amplifier 15 occurs, one or the other of the inputs to the OR gate 16 is a positive pulse of relatively short duration. The output of the OR gate 16 in turn is supplied to one of two inputs of an AND gate 17, the other input to which is obtained from the sensing amplifier for the clock track recorded on the tape; and during the time interval when the transitions recorded on the tape are to be detected, this clock signal is a positive input signal, enabling the AND gate 17. Thus, any pulses passed by the OR gate 16 during the appearance of a positive clock signal are passed by the AND gate 17.

Out put pulses passed by the AND gate 17 then are supplied to the set "1" trigger input of a transition detection flip-flop 20, which is normally set to its "0" condition, to set the flip-flop 20 to its "1" condition whenever a signal transition is detected on the data track during the time of occurrence of the clock pusle on the clock track. Thus, if any signal transition is detected by the squaring amplifier 15, the "1" output of the flip-flop 20 is a positive output and is passed by an OR gate 21 to the enabling input of an AND gate 22, the other inputs to which are obtained from the "1" output of the squaring amplifier 15 and a read-out pulse which occurs after the flip-flop 20 is set by a signal transition (see FIG. 3, waveform F). If the signal transition is representative of a negative-to-positive transition, the squaring amplifier 15 should bet set to its "1" state at this time, and the AND gate 22 then is enabled to pass the read-out pulse. The output of the AND gate 22 supplies output signals to one input of an output OR gate 23, the output of which is indicative of the data read on the particular channel with which this circuit is associated.

If the information on the data track being read is a positive-to-negative signal transition, the "0" output of the squaring amplifier is positive with the "1" output thereof being negative; so that the AND gate 22 is not enabled. As a consequence, no positive pulse is passed by the OR gate 23; so that the output then is negative indicating that a "space" was recorded and properly read from the data track.

The outputs of the detecting circuits 10 are checked for proper parity by supplying the output potential obtained from the "1" outputs of the squaring amplifiers 15 to a conventional vertical parity check circuit 30. One input to the parity check circuit 30 is obtained from each of the detection circuits 10 associated with the particular parity track which also is supplied as an input to the parity checking circuit 30 for each of the groups of odd and even channels. If parity checks, that is, if correct parity is indicated by an even number of "marks" from the outputs of the squaring amplifiers 15 in the detection circuits 10, when combined with the output of the parity check track, the "1" output of the parity check circuit 30 is positive, with the "0" output thereof being negative. Then a positive output signal is applied from the "1" output of the parity check circuit 30 to one input of the OR gate 21; so that the state of the flip-flop 20 has no effect on the output, and the OR gate 21 produces a positive enabling potential to the input of the AND gate 22. Thus, if the "1" output of the squaring amplifier 15 is positive, the AND gate 22 continues to be enabled and passes the read-out pulse which appears at the OR gate 23 as an indication of a "mark" recorded in that level of the data track. On the other hand, if the output of the squaring amplifier 15 is such that the "0" output thereof is positive with the "1" output thereof being negative, the AND gate 22 is not enabled, and the output thereof remains negative; so that the output of the OR gate 23 is negative indicating that a "space" was recorded in the data track in the position being read.

If for some reason the output of the parity check circuit 30 indicates an incorrect parity, the "0" output thereof is positive with the "1" output being negative. For detection circuits 10 detecting a signal transition, the transition detection flip-flop 20 provides a positive output on the "1" output thereof which is passed by the OR gate 22 to enable the AND gate 23 as stated previously; so that the output of the parity check circuit has no effect on those signal detection circuits 10 which detect a signal transition. In the event, however, that a detection circuit 10 does not detect a signal transition, the flip-flop 20 remains set to its "0" state; and provides a positive output signal on the "0" output terminal, with a negative output signal being obtained from its "1" output. The OR gate 21 then does not have a positive input signal applied to it from either the flip-flop 20 or the parity check circuit 30 for any circuit 10 not detecting a transition at a time when the parity check circuit 30 indicates a failure of correct parity.

In this event, however, an AND gate 31 is enabled by the positive outputs obtained from the "0" outputs of the flip-flop 20 and parity check circuit 30 and provides a positive output signal to an AND gate 32. A second input to the AND gate 32 is obtained from the "0" output of the squaring amplifier 15; so that if the "0" output of the squaring amplifier 15 is positive, the AND gate 32 is enabled to pass the read-out pulse, which in turn is passed by the OR gate 23 to indicate the presence of a "mark" in the data track under consideration. This output pulse is obtained even though no signal transition was detected by the circuit. If the "0" output of the squaring amplifier 15 is negative, the read-out pulse is not passed and the output of the OR gate 23 remains negative, indicating the presence of a "space" in the data track under consideration. Shortly after the occurrence of the read-out pulse, a reset pulse (waveform G, FIG. 3) appears and is applied to the reset input of the flip-flop 20 to reset it to its "0" state. This reset pulse is timed to occur prior to the appearance of the next positive pulse on the clock track input.

With the operation of the circuit shown in FIG. 1 in mind, reference now should be made to FIG. 2 which shows a plurality of signal detection circuits 10, associated with the inputs of the odd numbered tracks 1, 3 and 5 on the tape being read, and a plurality of signal detection circuits 10′ associated with the even numbered tracks 2, 4 and 6. The input reading or sensing circuits for the tracks 1 through 6 are indicated in FIG. 2 by showing a block numbered with the corresponding number for the data track being sensed. It should be understood that any suitable sensing devices commonly employed with phase modulation recording may be employed in conjunction with the signal detection circuit shown in the drawings. For that reason, these input reading circuits have not been disclosed in detail.

The reading circuit for the clock track is shown as a clock track sensing circuit 40, providing an output which is supplied to the inputs of all of the signal detection circuits 10 and 10′. In addition, the output of the clock track sensing circuit 40 is supplied through first and second delay circuits 41 and 42 which provide the short duration positive pulses corresponding to the read-out and reset pulses described above in conjunction with the description of FIG. 1. These pulses also are shown in waveforms F and G of FIG. 3, so that their relation to the clock track A may readily be ascertained.

It should be noted that two or more clock tracks identical to clock track A (FIG. 3) could be provided at separated points on the tape. The outputs of the clock track sensing circuits then could be supplied to an OR gate, the output of which then would be used in place of the direct output of the sensing circuit 40. The use of two or more clock tracks would insure that dropouts in the area of one clock track would have no affect on the operation of the circuit.

In order to provide the maximum error detection and correction capability, it is desirable to divide the data tracks into two groups, each having tracks which are taken from widely separated areas on the tape, and to provide a parity check track for each of these two groups. This is necessitated by the fact that a dropout or the failure of a signal transition to be recorded on the tape or read therefrom generally is caused by the appearance of a small speak of dust or foreign matter on the tape. Such small particles of foreign matter may span two adjacent channels but rarely span more than two adjacent channels. Thus, by grouping all of the odd channels together for one parity check and all of the even channels together for another parity check, no two adjacent channels are involved in the same parity check; so that the chances of correctly detecting and identifying the errors are substantially improved by utilizing the two groups.

For the odd numbered channels, an odd channel parity track is recorded and is read by an odd channel parity read-out circuit 44. Similarly, for the even numbered channels, an even channel parity track is provided and is read by an even channel parity read-out circuit 44′. The outputs of the odd and even channel parity read-out circuits 44 and 44′ are supplied to squaring amplifiers 45 and 45', respectively. These squaring amplifiers may be of the same type as the squaring amplifier 15 used in each detection circuit 10. The "1" outputs of the squaring amplifiers 45 and 45' are supplied to the odd channel parity check circuit 30 and the even channel parity check circuit 30', respectively, to be compared with the inputs provided to these circuits from the respective signal detection circuits 10 and 10'.

In the operation of the circuit shown in FIG. 2, all of the signal detection circuits 10 are operated simultaneously. In the event that a signal transition is detected in each of the circuits 10 and 10' and that the outputs of the odd channel parity check circuit 30 and the even channel parity check circuit 30' indicate correct parity, the output pulses obtained from the OR gates 23 indicate the state of the signals as recorded on the tape and as read out therefrom. If, however, for some reason a dropout occurs in any of the levels of the tape, no signal is detected by the signal transition detection flip-flop 20 associated with the signal detection circuit 10 or 10' for that data track on the tape. At the same time the output of the parity check circuits 30 or 30' associated with the level of the tape having no signal transition thereon either indicates correct or incorrect parity. If the parity check circuit indicates correct parity, the inputs to the AND gate 22 then are utilized to ascertain whether or not the missing signal transition should have been a "mark" or a "space."

Refer now to FIG. 3 which shows, for the number 4 character recorded on the tape, a missing signal transition on data track 5, with a constant positive output provided by the reading circuit for that track during the positive clock pulse. The signal detection circuit 10 associated with data track number 5 then provides a positive output from the "1" output of the squaring amplifier 15 therein, since the input to this amplifier is a positive potential. Assume that correct parity is detected by the parity check circuit 30 for the odd channel. If this is true, the OR gate 21 passes a positive potential which, when combined with the positive potential obtained from the output of the squaring amplifier 15 in the AND gate 22, permits passage of the read-out pulse applied to the input of the AND gate 22, resulting in positive output being obtained from the OR gate 23 indicative of a "mark," as if a "mark" transition were in fact recorded in that level of the tape for the fourth character. Referring to FIG. 3, it is shown that to have correct parity, it is necessary for an odd number of "marks" to occur in these three data tracks 1, 3 and 5; so that this would be a correct output indication.

Now again assume that a "mark" signal transition or a negative-to-positive signal transition should have been recorded in data track number 5, but that no signal transition occurs and that the output of the data track 5 reading circuit is a negative signal applied to the input of the squaring amplifier 15 associated with that track. In such a situation, an even number of "mark" indications are supplied to the input of the parity check circuit 30, but the input to the parity check circuit for the parity check track is a "mark," indicative that an odd number of marks should have been recorded in the three data tracks; so that a parity failure results. As stated previously, this causes a positive potential to be obtained from the "0" output of the parity check circuit 30 with a negative potential being obtained from the "1" output thereof. At the same time, the "0" output of the squaring amplifier 15 is positive with a negative output being obtained from the "1" output thereof. Thus, the AND gate 22 is not enabled, but the AND gate 31 passes a positive potential due to the fact that no signal transition occurred and incorrect parity exists. This then enables the AND gate 32, which has a second enabling potential obtained from the positive "0" output of the squaring amplifier 15. When the read-out pulse then is applied to the inputs of the AND gates 22 and 32, the AND gate 32 passes a positive pulse through the OR gate 23 thus supplying the missing "mark" signal output indication for data track 5.

A similar analysis may be made to show that the circuit correctly supplies a missing "space" indication. For example, referring to the number 3 character shown in FIG. 3, assume that the "space" signal transition on data track 1 is missing and that the information level of data track 1, obtained from the output of the reading circuit, is a positive signal. When this occurs, the output of the squaring amplifier 15 for track 1 provides a positive output potential on the "1" output and a negative output potential on the "0" output, thus enabling AND gate 22 and disabling AND gate 32 in the detection circuit 10 for that track. At the same time, the three inputs supplied to the parity check circuit 30 for character number 3 all are "mark" inputs. The "space" input to the parity check circuit 30 obtained from parity track, however, indicates that the number of marks recorded on these tracks for character number 3 should be even. As a consequence, the output of the parity check circuit 30 indicates a parity failure, with a positive output potential being obtained from the "0" output thereof, and a negative output potential being obtained from the "1" output thereof. When this occurs, the AND gate 31 is enabled but the AND gate 32 is disabled; so that no read-out pulses can be passed by the AND gate 32. At the same time, neither of the inputs to the OR gate 21 are positive; so that the AND gate 22 also is disabled. Thus, both of the inputs to the OR gate 23 are negative, and the output thereof then supplies the necessary information that the missing signal transition was a "space."

Again, referring to FIG. 3 and to the third character interval indicated thereon, assume that the "space" transition for data track 1 again is missing, but that the output of the reading circuit for data track 1 is a negative output which is supplied to the input of the squaring amplifier 15 of the detection circuit 10 for data track 1. This causes a positive output potential to be obtained from the "0" output of the amplifier 15 with a negative output being obtained from the "1" output thereof. As a consequence, the AND gate 22 is disabled and cannot pass any read-out pulses. The inputs to the parity check circuit 30, however, continue to be correct; so that correct parity is indicated, causing a positive output potential to be obtained from the "1" output of the parity check circuit 30, and a negative output potential to be obtained from the "0" output thereof. This results in a failure to enable the AND gate 31, which in turn causes the AND gate 32 to be disabled; so that the AND gate 32 cannot pass the read-out pulse either. As a consequence, both inputs to the OR gate 23 are negative and the output of the OR gate 23 then is a correct indication that the missing transition for data track number 1 should have been a "space" signal transition.

In summary, it can be seen that the AND gates 22 and 32 permit the state of the squaring amplifier 15 in the signal transition detection circuit 10 associated with a given data track to be read out directly if parity checks, or if the signal transition flip-flop 20 changed state. In the event that incorrect parity occurs and the flip-flop 20 does not change state, the inverse of the squaring amplifier output is read out. At the completion of each cycle of operation, the signal transition flip-flops 20 in all of the detection circuits 10 and 10' are reset to their "0" states.

The circuit described above is incapable of accurately correcting errors when more than two dropouts occur in the data tracks associated with each of the parity check circuits 30 and 30'. In order to provide an alarm in the event that more than two dropouts occur in the data tracks associated with either of the parity check circuits 30 or 30', the "0" output of the signal transition detection flip-flop 20 may be supplied to the inputs of a conventional multi-signal detector 50 or 50', the outputs of which are supplied to an OR gate 51 which provides the alarm indication at its output. The outputs of the detectors 50 and 50' are negative so long as one or less of their inputs are at a positive potential. In the event that more than one input to either of the detector circuits 50 or 50′ is at a positive potential, a positive output is obtained from the detector and is passed by the OR gate 51 to provide an alarm indication. For all normal conditions of operation of the circuit or for conditions wherein only one of the flip-flops 20 associated with a detector 50 or 50′ applies a positive input to the detector, the output of the detector is negative at the time of occurrence of the read-out pulse and no alarm indication is made.

It should be noted that more or less than six data tracks and different numbers of parity and clock tracks may be utilized in adapting the teachings of this invention to different applications. The particular number and arrangements of data, parity, and clock tracks used in the foregoing description is merely illustrative of one preferred embodiment of the invention.

Although a particular embodiment of the invention is shown in the drawing and has been described in the foregoing specification, other modifications of the invention, varied to fit particular operating conditions, will be apparent to those skilled in the art; and the invention is not to be considered limited to the embodiment chosen for purposes of disclosure but it covers all changes and modifications which do not constitute departures from the true scope of the invention.

What is claimed is:

1. In an error detection and correction system for use in conjunction with a magnetic tape reader for reading tape having characters recorded in parallel data tracks in the form of signal transitions with a parity check bit recorded in conjunction with each parallel recorded character:

means associated with each data track for providing a binary output signal which is indicative of the state of the binary signal recorded on that associated data track, each said output providing means normally providing a change in output during a predetermined time interval;

means associated with each data track for sampling the output of the associated binary output signal providing means during said predetermined time interval to detect the presence or absence of a change in the output of each said binary output providing means;

means associated with each data track and responsive to the output of the associated sampling means for providing a first output signal whenever an output change is detected by the associated sampling means and for providing a second output signal whenever no output change is detected by the associated sampling means;

means associated with each data track and responsive to the output signals of the associated binary output providing means and to the parity check bit for providing a first parity check output when a predetermined relationship exists therebetween and for producing a second parity check output when a different relationship exists therebetween; and means associated with each data track and responsive to the output of the associated binary output signal providing means and the first parity check output or responsive to the output of the associated binary output signal providing means, the second parity check output, and the second output signal of the associated output change signal providing means for producing an output indicative of the signal change which should have occurred when no signal change is detected by the associated sampling means for a particular track on the tape.

2. A system according to claim 1 wherein each binary output providing means is a squaring amplifier.

3. A system according to claim 1 wherein each output change signal providing means is a bistable flip-flop normally reset, prior to the beginning of the reading of each character, to provide the second output signal, said flip-flop being set to provide the first output signal in response to detection of the presence of a binary output signal change by the associated sampling means.

References Cited

UNITED STATES PATENTS

| | | | |
|---|---|---|---|
| 3,144,635 | 8/1964 | Brown et al. | 340—146.1 |
| 3,183,483 | 5/1965 | Lisowski | 340—146.1 |
| 3,273,120 | 9/1966 | Dustin et al. | 340—146.1 |

MALCOLM A. MORRISON, Primary Examiner

C. E. ATKINSON, Assistant Examiner

U.S. Cl. X.R.

340—174.1